United States Patent [19]

Srivastava

[11] Patent Number: 5,325,016
[45] Date of Patent: Jun. 28, 1994

[54] MERCURY VAPOR LAMP WITH TERBIUM-ACTIVATED GADOLINIUM BORATE LUMINESCENT LAYER

[75] Inventor: Alok M. Srivastava, Schenectady, N.Y.

[73] Assignee: General Electric Company, Schenectady, N.Y.

[21] Appl. No.: 918,826

[22] Filed: Jun. 22, 1992

[51] Int. Cl.⁵ .................... C09K 11/78; H01J 1/63
[52] U.S. Cl. .................... 313/486; 313/485; 313/493; 252/301.4 R
[58] Field of Search ............ 313/485, 486, 493; 252/301.4 R

[56] References Cited

U.S. PATENT DOCUMENTS

| | | | |
|---|---|---|---|
| 4,093,890 | 6/1978 | Verriet et al. | 313/486 |
| 4,335,330 | 6/1982 | Peters et al. | 313/493 |
| 4,403,171 | 9/1983 | Nakano et al. | 313/486 |
| 4,914,347 | 4/1990 | Osawa et al. | 313/485 |
| 4,926,091 | 5/1990 | Verlijsdonk et al. | 313/486 |

OTHER PUBLICATIONS

Veenis et al., *Philips J. Res.*, 33, 124–132 (1978).

Primary Examiner—Donald J. Yusko
Assistant Examiner—Vip Patel
Attorney, Agent, or Firm—William H. Pittman

[57] ABSTRACT

A mercury vapor discharge lamp includes, as a luminescent material, a terbium-activated gadolinium borate wherein the terbium comprises about 2–40% of total terbium and gadolinium. Said material is capable of excitation by ultraviolet radiation at 254 nm. without sensitization by materials such as trivalent cerium.

3 Claims, 1 Drawing Sheet

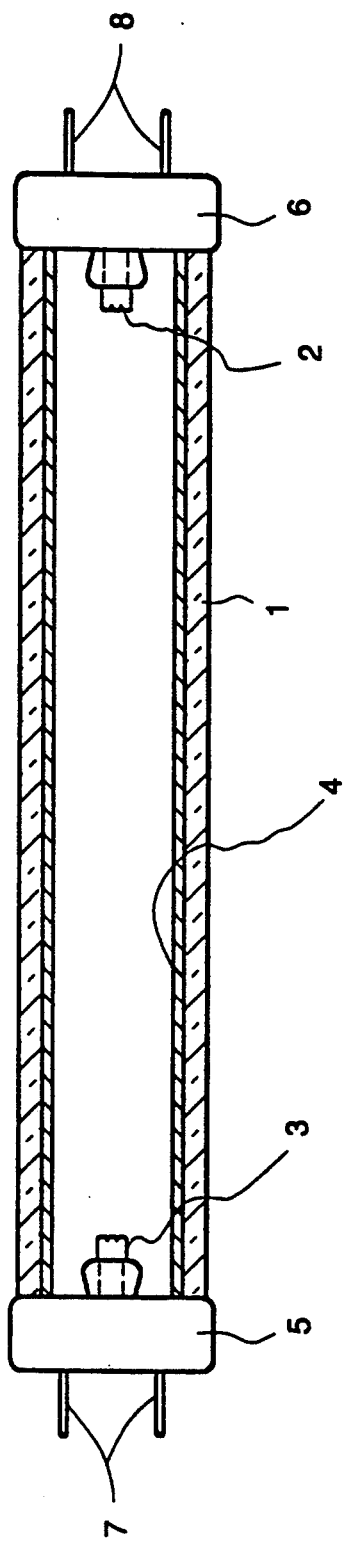

MERCURY VAPOR LAMP WITH TERBIUM-ACTIVATED GADOLINIUM BORATE LUMINESCENT LAYER

This invention relates to mercury vapor lamps, and more particularly to lamps containing improved luminescent materials.

Mercury vapor discharge lamps are characterized by the fact that the luminescent material therein is excited by ultraviolet radiation at 254 nm., the frequency at which the mercury vapor radiates when electrically activated. The choice of a luminescent material which can be excited at this wavelength is not trivial. Various gadolinium salts activated by trivalent terbium are known to be useful for this purpose, but they typically require sensitization of the terbium with various other ions such as trivalent cerium, since terbium otherwise does not efficiently absorb the ultraviolet radiation.

A class of suitable luminescent materials is disclosed in U.S. Pat. No. 4,926,091. It consists of terbium-activated alkaline earth metal rare earth metal borates. There is a continuing search, however, for additional materials having luminescent properties suitable for use in such lamps. The present invention is based on the discovery of a class of such materials.

Accordingly, the invention is a lamp comprising a sealed enclosure, and in said enclosure: a pair of electrodes, an amount of mercury effective to emit ultraviolet radiation when electrically activated, and a luminescent screen comprising, as the luminescent constituent, a composition corresponding to the formula $Tb_xGd_{1-x}BO_3$, wherein x has a value in the range of about 0.02–0.40.

The drawing depicts a typical design for a lamp in accordance with the present invention.

Referring to the drawing, a typical lamp of this invention includes a sealed enclosure defined by transparent or translucent exterior wall 1, typically of glass, and end pieces 5 and 6. Said enclosure is normally charged with at least one inert gas at a low pressure, typically on the order of 2–10 torr (about 250–1350 Pa.). It also contains a small amount of elemental mercury in vapor form, said amount being effective to excite the hereinafter-defined luminescent layer by ultraviolet radiation in the vapor state when electrically activated.

Electrodes 2 and 3 are electrically connected to contact pins 7 and 8 on end pieces 5 and 6, and are otherwise insulated from said end pieces. During operation, said contact pins form part of an electric circuit, whereby electrodes 2 and 3 activate the mercury vapor within the enclosure.

A layer 4 of luminescent material forms a coating on wall 1, said wall and coating together constituting a luminescent screen. Said layer 4 luminesces upon exposure to the radiation produced by the activated mercury. The luminescent screen may be created by conventional means, such as application of the luminescent material to wall 1 in the form of a suspension or paste.

The identity of the luminescent material is a crucial aspect of the invention. It is a terbium-activated gadolinium borate composition, characterized by the above formula in which terbium may be considered to replace a portion of the gadolinium. (It should be understood that this formula may be accurate only with respect to the stoichiometry of the composition.) The terbium comprises about 2–40%, and preferably about 5–30%, of the total terbium and gadolinium content of the composition; that is, x is in the range of about 0.02–0.40 and preferably about 0.05–0.30.

Terbium-activated gadolinium borates are known in the art, as described, for example, in *Phillips J. Res.*, 33, 124–132 (1978). They are described therein with respect to vacuum-ultraviolet radiation induced by xenon or xenon-krypton discharges. Their use in mercury vapor discharge lamps, without the necessary incorporation of a sensitizer ion such as trivalent cerium, is not believed to have been previously disclosed.

Such compositions may be prepared by a solid state reaction between gadolinium(III) oxide, boric acid and a terbium oxide, typically $Tb_4O_7$. The proportions of these materials are stoichiometric except that an excess of boric acid, typically about 5–15%, is normally employed. Reaction between these materials takes place upon heating to a temperature above about 800° C., most often about 1000°–1500° C., preferably in an inert atmosphere such as nitrogen saturated with water vapor and in the presence of carbon powder in the hot zone of the reaction vessel.

The preparation of terbium-activated gadolinium borates is illustrated by the following examples.

EXAMPLES 1–4

Gadolinium(III) oxide and $Tb_4O_7$ in various proportions were homogenized with a 10% molar excess of boric acid and the resulting mixtures were heated to 600° C. for 1 hour, in a nitrogen atmosphere saturated with water vapor and in the presence of carbon powder in the hot zone to produce the necessary reducing conditions, to decompose the boric acid. The temperature was then raised to 1000° C. and maintained at that temperature for 1 hour. The products were cooled and washed with hot water to remove unreacted boric acid. The residues were the desired luminescent compositions; the proportions of terbium and gadolinium oxides employed for their preparation are given in the following table.

| Example | Molar proportions | |
| --- | --- | --- |
|  | $Gd_2O_3$ | $Tb_4O_7$ |
| 1 | 0.95 | 0.05 |
| 2 | 0.90 | 0.10 |
| 3 | 0.80 | 0.20 |
| 4 | 0.70 | 0.30 |

The products of Examples 1–4 had crystal structures of the vaterite type. For $Tb^{+3}$ luminescence at 540 nm., the excitation spectrum of each product exhibited the $Gd^{+3}$ f—f line transitions, indicating efficient $Gd^{+3}$-$Tb^{+3}$ energy transfer, superimposed on a broad band with a maximum just below 250 nm, corresponding to the 4f-5d transition of the $Tb^{+3}$ ion. Due to the allowed nature of this transition, the $Tb^{+3}$ ions present a high absorption for the 254 nm. radiation of mercury.

What is claimed is:

1. A lamp comprising a sealed enclosure, and in said enclosure: a pair of electrodes, an amount of mercury effective to emit ultraviolet radiation when electrically activated, and a luminescent screen comprising, as the luminescent constituent, a composition corresponding to the formula $Tb_xGd_{1-x}BO_3$, wherein x has a value in the range of about 0.02–0.40.

2. A lamp according to claim 1 wherein said enclosure is charged with at least one inert gas at a pressure of about 2–10 torr.

3. A lamp according to claim 2 wherein x is in the range of about 0.05–0.30.

* * * * *